United States Patent [19]

Kawai et al.

[11] Patent Number: 4,838,577
[45] Date of Patent: Jun. 13, 1989

[54] PASSIVE SEAT BELT SYSTEM

[75] Inventors: Osamu Kawai; Shunzi Mizumura, both of Fujisawa, Japan

[73] Assignee: Nippon Seiko Kabushiki Kaisha, Tokyo, Japan

[21] Appl. No.: 176,330

[22] Filed: Mar. 31, 1988

[30] Foreign Application Priority Data

Apr. 6, 1987 [JP] Japan ............... 62-51072[U]

[51] Int. Cl.⁴ .............................. B60R 22/06
[52] U.S. Cl. .............. 280/804; 242/107.4 A; 307/10.1
[58] Field of Search ............ 280/802, 804, 806, 807; 242/107.4 A, 107.4 B; 297/469, 476, 477, 478; 307/10 SB; 340/52 G

[56] References Cited

U.S. PATENT DOCUMENTS

| 4,253,622 | 3/1981 | Nishina | 280/806 |
| 4,296,942 | 10/1981 | Clifford | 280/807 |
| 4,344,588 | 8/1982 | Hollowell | 280/806 |
| 4,345,781 | 8/1982 | Suzuki et al. | 280/804 |
| 4,498,689 | 2/1985 | Duffield et al. | 280/807 |
| 4,730,844 | 3/1988 | Patterson | 280/806 |

FOREIGN PATENT DOCUMENTS 2062444  5/1981  United Kingdom ............... 280/804

Primary Examiner—Charles A. Marmor
Assistant Examiner—Karin Tyson
Attorney, Agent, or Firm—Shapiro and Shapiro

[57] ABSTRACT

A passive seat belt system includes a seat belt; a slide anchor connected to one end of the belt and reciprocally movable from a fasten end at which a person on a vehicle is bound to a release end at which the person on the vehicle is released, in response to opening and closing of a door; a winder connected to the other end of the seat belt having an emergency lock mechanism for blocking the feed of the seat belt in an emergency case and a forcible release device for unlocking the emergency lock mechanism; and a controller for moving said slide anchor to the release end when said forcible release device is actuated to unlock said emergency lock mechanism.

3 Claims, 1 Drawing Sheet

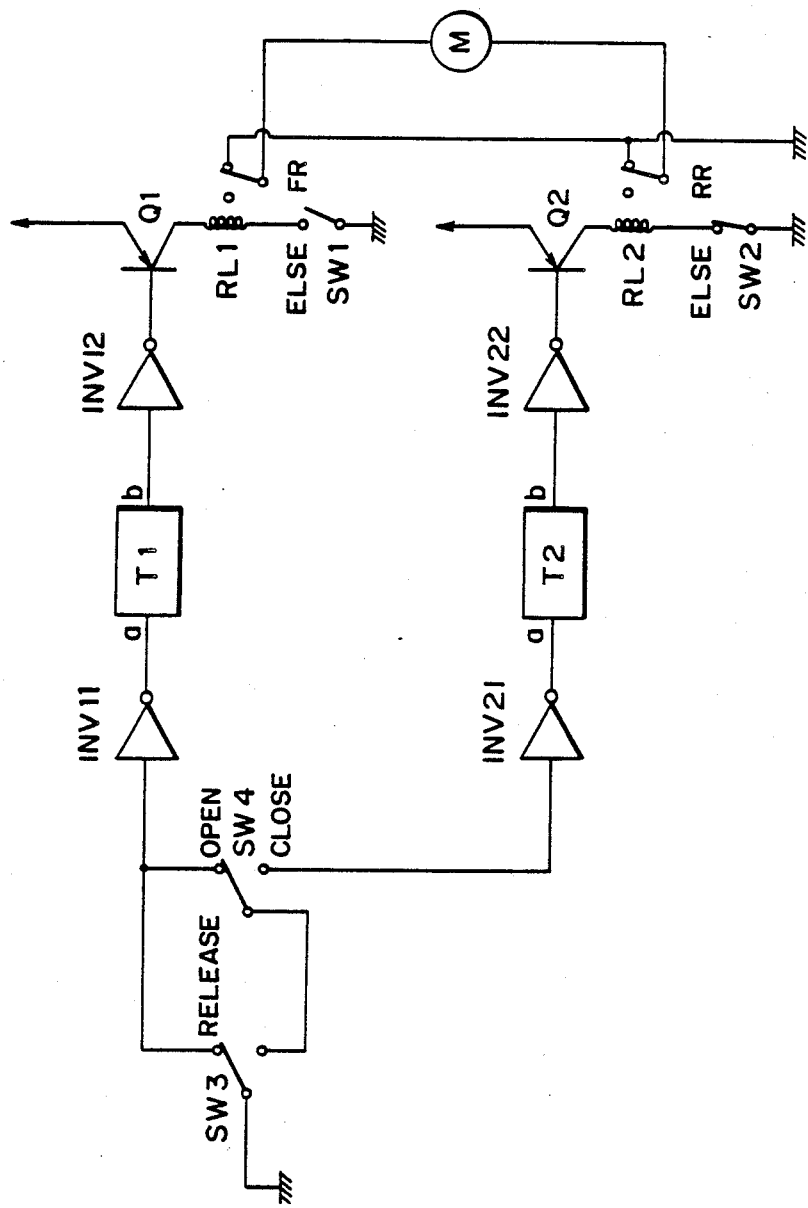

PASSIVE SEAT BELT SYSTEM

BACKGROUND OF THE INVENTION

1. Field of the Invention

The present invention relates to a passive seat belt system to automatically bind and release persons on a vehicle in response to closing and opening of a door, and more particularly to a controller for a passive belt system having a forcible release device for an emergency lock mechanism.

2. Related Background Art

As disclosed in U.S. Pat. No. 4,218,033 assigned to General Motors Corp. and issued on Aug. 19, 1980, a passive seat belt device has an emergency lock mechanism (for example, a retractor) for blocking feeding of a seat belt in an emergency case such as collision and a device for forcibly releasing the lock mechanism (for example, a spool release).

As disclosed in U.S. Pat. No. 4,410,061 assigned to Toyota Automobile Industries Co., Ltd. and issued on Oct. 18, 1983 and Japanese Utility Model Publication No. 10669/1984 filed by Takada Co., Ltd. and published on Feb. 26, 1983, when the spool release is actuated to unlock the retractor, the unlocked state of the retractor is indicated to the person on the vehicle by a warning lamp or buzzer. Even so, if the spool release is actuated to unlock the retractor, the person on the vehicle is bound if the seat belt is at a fasten end. Consequently, he may still misperceive the status of the retractor.

SUMMARY OF THE INVENTION

It is an object of the present invention to eliminate the problem encountered in the prior art system.

It is another object of the present invention to render the seat belt system unbound when the spool release is in the release state in order to enhance safety.

In order to achieve the above objects, there is provided a passive seat belt system comprising a seat belt, a slide anchor connected to one end of the seat belt and reciprocally movable from a fasten end at which the person on the vehicle is bound to a release end at which the person on the vehicle is not bound, a winder connected to the other end of the seat belt having an emergency lock mechanism for blocking the feed of the seat belt in an emergency case and a forcible release device for forcibly unlocking the emergency lock mechanism, wherein the slide anchor is moved to the release end when the forcible release device is actuated to release the emergency lock mechanism.

BRIEF DESCRIPTION OF THE DRAWING

FIGURE is a block diagram showing an embodiment of the present invention.

DETAILED DESCRIPTION OF THE PREFERRED EMBODIMENT

FIGURE shows one embodiment of the present invention. A passive seat belt system of the present invention comprises a seat belt (not shown), a slide anchor (not shown) connected to one end of the seat belt and reciprocally movable in response to opening and closing of a door, a winder (not shown) connected to the other end of the seat belt, and a controller for the slide anchor to be described in detail hereinafter.

The slide anchor is slidable on a guide rail (not shown) extending longitudinally of a car body and is reciprocally movable from a fasten end at which a person on the vehicle is bound to a release end at which the person on the vehicle is not bound. The slide anchor moves in accordance with the sitting state of the person on the vehicle (opening and closing states of the door). The reciprocal movement is driven by a motor M.

The winder has an emergency lock mechanism for blocking feeding of the seat belt in an emergency case, and a forcible release device (not shown) which forcibly unlocks the emergency lock mechanism.

The controller for the slide anchor moves the slide anchor to the release end when the forcible release device is actuated to release the emergency lock mechanism.

The direction of rotation of the motor M is controlled by a relay circuit. Relays RL1 and RL2 of the relay circuit are grounded through limit switches SW1 and SW2 mounted at the release end and the fasten end of the seat belt, respectively. Timers T1 and T2 are connected to bases of drive transistors Q1 and Q2 of the relay circuit through inverters INV12 and INV22, respectively. The timers T1 and T2 are connected to opening and closing contacts of a door switch SW4, through the inverters INV11 and INV21, respectively.

SW3 denotes a detection switch which is opened and closed in response to the actuation of the forcible release device. A release contact thereof is connected to the open contact of the door switch SW4, a non-release contact of the detection switch is connected to the close contact of the door switch SW4, and an actuation contact of the detection switch is grounded.

When a signal "1" (high level) is applied to an input a of the time T1 or T2, an output b thereof is kept at "1" (high level) for a predetermined time and then it assumes "0" (low level). When the input a is "0" (low level), the output b is "0" (low level). When the input a changes to "0" (low level) when the output b is "1", the output b immediately assumes "0" (low level). The timers T1 and T2 serve to stop the drive of the motor when the slider does not reach the release end or fasten end in the preset time. Thus, they monitor the movement of the slider.

The release end switch SW1 and the fasten end switch SW2 are limit switches which are turned off when they are at the release end and the fasten end, respectively, and turned on in other cases.

Let us consider a normal case where the detection switch SW3 is in the non-release position. When the person on the vehicle opens the door to get off the vehicle while the slider of the seat belt is at the fasten end, the door switch SW4 is switched from the closed position to the open position. The input to the inverter INV11 is "0" (low level) and the output thereof is "1" (high level), which is supplied to the timer T1. Then, the input of the inverter INV12 changes to "1" and the output thereof changes to "0" so that the transistor Q1 is turned on and the relay RL1 is energized to move the seat belt to the release end. When the person opens the door to get on the vehicle while the seat belt is at the release end, the time T2 is actuated and the relay RL2 is energized to move the seat belt to the fasten end.

When the emergency lock mechanism is in the unlock state, the detection switch SW3 is at the release position and the input to the inverter INV11 is always "0". Thus, the timer T1 circuit is activated and the time T2 circuit is not activated. That is, no current flows through the relay RL2 irrespective of the state of the door switch SW4, and hence the seat belt is not moved to the fasten end.

The seat belt controller used in the present invention is not limited to that in the illustrated embodiment other controllers may be used within the scope of the present invention.

In accordance with the present invention, when the forcible release mechanism for the emergency lock is actuated, the slide anchor is moved to the unbound position so that the person on the vehicle does not fail to recognize it as the release of the emergency lock.

When the emergency lock is released in the emergency case such as collision, the slide anchor is moved to the unbound position so that the person on the vehicle can escape from the vehicle more freely.

Since the wasteful operation of the system is prevented when the belt is not used, the protection of the system and the saving of the battery are enhanced.

I claim:

1. A passive seat belt system for a vehicle, comprising:
    a seat belt;
    a slide anchor connected to one end of said seat belt and reciprocally movable from a fasten position, at which a person on the vehicle is bound, to a release position, at which the person on the vehicle is released;
    a winder connected to another end of said seat belt and having an emergency lock mechanism for blocking feeding of said seat belt in an emergency case;
    a forcible release device for unlocking said emergency lock mechanism;
    detection switch means for detecting that said forcible release device is actuated to unlock said emergency lock mechanism; and
    controller means for moving said slide anchor to said release position when said detection switch means detects that said forcible release device is actuated to unlock said emergency lock mechanism.

2. A passive seat belt system according to claim 1, wherein said controller means includes a door switch responsive to opening and closing of a door of the vehicle, and said controller means drives said slide anchor to said release position irrespective of the state of said door switch when said detection switch means detects that said forcible release device is actuated to unlock said emergency lock mechanism.

3. A passive seat belt system according to claim 1, wherein said controller means includes a door switch responsive to opening and closing of a door of the vehicle, said controller means moves said slide anchor between said fasten position and said release position in accordance with the state of said door switch, and said detection switch means takes priority over said door switch in actuating said controller means to move said slide anchor.

* * * * *